US012037960B2

(12) United States Patent
Dannenfeldt et al.

(10) Patent No.: US 12,037,960 B2
(45) Date of Patent: Jul. 16, 2024

(54) PISTON AND METHOD FOR PRODUCING SAME

(71) Applicant: FEDERAL-MOGUL NURNBERG GMBH, Nuremberg (DE)

(72) Inventors: Margrit Dannenfeldt, Nuremberg (DE); Carolin Kleinlein, Nuremberg (DE)

(73) Assignee: Federal-Mogul Nurnberg GmbH, Nuremberg (DE)

( * ) Notice: Subject to any disclaimer, the term of this patent is extended or adjusted under 35 U.S.C. 154(b) by 0 days.

(21) Appl. No.: 17/784,143

(22) PCT Filed: Dec. 7, 2020

(86) PCT No.: PCT/EP2020/084882
§ 371 (c)(1),
(2) Date: Jun. 10, 2022

(87) PCT Pub. No.: WO2021/116018
PCT Pub. Date: Jun. 17, 2021

(65) Prior Publication Data

US 2023/0023170 A1 Jan. 26, 2023

(30) Foreign Application Priority Data

Dec. 12, 2019 (DE) ..................... 10 2019 219 445.1

(51) Int. Cl.
*F02F 3/10* (2006.01)
*F02F 3/02* (2006.01)

(52) U.S. Cl.
CPC .............. *F02F 3/105* (2013.01); *F02F 3/027* (2013.01)

(58) Field of Classification Search
CPC .... F02F 3/027; F02F 3/10; F02F 3/105; F16J 1/04; F16J 1/08; F16J 1/09
See application file for complete search history.

(56) References Cited

U.S. PATENT DOCUMENTS 4,760,771 A * 8/1988 Felici ......................... F16J 1/08 123/193.6
5,314,717 A 5/1994 Alt
(Continued)

FOREIGN PATENT DOCUMENTS

CN 1782358 A 6/2006
CN 103224306 A 8/2013
(Continued)

OTHER PUBLICATIONS

M. Scholle, Hydrodynamical Modelling of Lubricant Friction Between Rough Surfaces, Tribology International 40 (2007), pp. 1004-1011.

*Primary Examiner* — Michael Leslie
(74) *Attorney, Agent, or Firm* — Robert L. Stearns; Dickinson Wright PLLC

(57) ABSTRACT

The present invention relates to pistons (10) for use in internal combustion engines, having: a piston crown (12) which is adjoined by a piston skirt (14), wherein the piston skirt (14) has surfaces (18) which abut the cylinder wall during use of the piston, wherein the surfaces (16) have one or more friction-reducing coatings (18) and wherein depressions (20) are provided in the coating, which are arranged such that the spacing S between each two adjacent depressions (20) along the axial direction (A) of the piston and the width L of the depressions (20) along the axial direction (A) of the piston satisfy the formula S>2L.

11 Claims, 2 Drawing Sheets

(56) References Cited

U.S. PATENT DOCUMENTS

| | | | | |
|---|---|---|---|---|
| 7,171,936 | B2 * | 2/2007 | Rein | C23C 4/16 29/888.048 |
| 7,287,459 | B2 * | 10/2007 | Tabata | F02F 3/105 92/159 |
| 8,069,773 | B2 * | 12/2011 | Suzuki | F02F 3/105 92/158 |
| 8,202,004 | B2 * | 6/2012 | Koizuka | F16C 33/1065 384/291 |
| 8,640,669 | B2 * | 2/2014 | Nakazawa | F16J 1/04 123/193.6 |
| 9,086,030 | B2 * | 7/2015 | Suzuki | F16J 1/08 |
| 9,719,459 | B2 * | 8/2017 | Hayashi | F02F 3/105 |
| 10,018,147 | B2 * | 7/2018 | Oso | F02F 3/0084 |
| 10,174,711 | B2 * | 1/2019 | Takada | F16J 1/04 |
| 10,927,787 | B2 * | 2/2021 | Suda | F16J 1/02 |
| 2015/0128894 | A1 | 5/2015 | Hayashi et al. | |
| 2016/0312739 | A1 | 10/2016 | Oso et al. | |

FOREIGN PATENT DOCUMENTS

| | | | | | |
|---|---|---|---|---|---|
| CN | 103244306 | A | | 8/2013 | |
| CN | 203146127 | U | | 8/2013 | |
| DE | 102005057754 | A1 | | 6/2006 | |
| DE | 112012003279 | T5 | | 5/2014 | |
| DE | 102016207777 | A1 | | 11/2016 | |
| DE | 102016205199 | A1 | | 10/2017 | |
| EP | 466978 | A2 | | 1/1992 | |
| EP | 3085939 | A1 | | 10/2016 | |
| JP | 2005320934 | A | | 11/2005 | |
| JP | 2008121776 | A | | 5/2008 | |
| JP | 2012189223 | A | | 10/2012 | |
| JP | 2013136961 | A | | 7/2013 | |
| JP | 2014214731 | A | * | 11/2014 | F02F 3/00 |
| JP | 2015094318 | A | | 5/2015 | |
| KR | 20120053896 | A | * | 5/2012 | F16J 1/08 |

* cited by examiner

PISTON AND METHOD FOR PRODUCING SAME

BACKGROUND

1. Technical Field

The present invention relates to a piston for use in internal combustion engines. It also relates to a method for producing such a piston.

2. Related Art

Pistons are used in internal combustion engines to drive a motor vehicle via a crankshaft. The pistons move up and down inside the cylinder of the internal combustion engine and are guided by the walls of the cylinder.

Since the pistons abut these walls, there is friction between the piston and the walls. This results in wear and energy losses. For these reasons, the piston is lubricated with oil and the piston surfaces that are in contact with the cylinder are provided with friction-reducing coatings. Examples of such coatings are described in DE 10 2005 057 754 B4, for example.

As a result of a corresponding reduction in friction, the amount of exhaust gas of the vehicle, in this case primarily carbon dioxide, is supposed to be reduced and other requirements are also supposed to be met. Further measures for reducing friction that are considered include, inter alia, the use of lower-friction coatings and the use of an oil with lower viscosity. Moreover, solutions are known such as that described in DE 10 2005 057754 B4, for example, in which a reduction in friction is supposed to be achieved by applying a patterned coating. Known patterns are spots, zig-zag profiles and V profiles.

SUMMARY

The inventors realised, however, that these solutions can be optimised further still as far as friction reduction is concerned.

A piston is a piston for use in internal combustion engines, such as diesel engines, but also petrol engines is provided and may be made of steel or aluminium/aluminium alloys. Other materials are also conceivable, however.

The piston has a piston crown. This piston crown often has a combustion-chamber bowl and is opposite the combustion chamber of the cylinder during use. A force is exerted on this piston crown in the engine during combustion, which force pushes the piston in a direction that is directed outwards. The piston crown is adjoined by a piston skirt. The piston skirt has convex surfaces at least in parts, which abut the cylinder wall during use of the piston. These surfaces recede with respect to a cylinder surface at the edge surfaces of the contact surface. These convex surfaces form the pressure walls or counter-pressure walls and are also referred to as skirt walls. The piston skirt also has box walls which have pin bosses for supporting piston pins. The convex surfaces abut the cylinder wall of the internal combustion engine during use.

The convex surfaces in most cases have one or more friction-reducing coatings. Polymer-bound coating materials, which comprise solid lubricants, are used as coatings. Polyamide imide or phenolic resin is often used as the polymer. Graphite is often used as the solid lubricant, but $MoS_2$ or PTFE may also be used. Other materials, such as those that are described in DE 10 2016 205 199 A1, may also be used. These friction-reducing coatings exhibit less friction in the interaction with the cylinder wall than the piston material.

Depressions are provided in the coating, which are arranged in such a way that the spacing S between each two directly adjacent depressions along the axial direction of the piston and the width L of the depressions along the axial direction of the piston satisfy the formula $S>2L$. According thereto, the spacing between two depressions that are adjacent to one another in the axial direction is greater and in particular greater than twice the width of the depressions. In the case of unevenly formed depressions, the width L of the depression denotes the maximum width of the depression along the axial direction. These depressions preferably cover at least 3%, more preferably at least 10%, of the area of the coating.

The inventors realised that pistons with corresponding spacing between the depressions are particularly low-friction, which has been attributed to particularly good oil retention properties (without wishing to be limited to this theory). According to another theory, these effects can occur particularly in the case of slots, since oil vortex build-up is particularly pronounced there. The friction-reducing effect is less pronounced with increasingly greater spacing S. Particularly preferably, the spacing is smaller than 10% of the skirt height.

The depressions are preferably longer than they are broad, i.e. $E>L$. Such pistons are particularly friction-reduced. The fact that the depressions preferably cover at least 3%, more preferably at least 10%, of the area of the coating, ensures that they have a significant impact on the oil retention behaviour of the piston.

The length E is intended to be smaller than the width of the coating E', such that the depressions are completely in the coating at least on one side. The depressions are entirely surrounded by the respective coating—in other words, the material of the coating completely encloses the primarily rectangular depressions. This prevents oil from draining away.

More preferably, the intention is for a plurality of depressions to be adjacent to one another horizontally in a row (i.e. in alignment along the circumference). The width of the webs of coating material between these aligned depressions (i.e. the spacing along the circumference between the depressions) has to be greater than 0 (e.g. greater than 1 μm or greater than 100 μm).

However, it is advantageous for the thickness of the webs (i.e. the layer thickness of the coating) to be the same as the thickness of the layer in the region of the spacing S—in other words, the material of the coating has a substantially constant thickness over the entire coating. This thickness of the coating material is preferably between 5 and 25 μm, more preferably between 10 and 15 μm. Such coatings can be created particularly well by means of screen printing.

It is preferred that one depression be provided per 5°-30°, particularly preferably per 10°, of the piston circumference and that these depressions be provided in a row along the circumference. The depressions may also be of different lengths.

In this connection, it is particularly preferable for the depressions to extend into at most 35% of the area of the coating (i.e. for the area of the depressions relative to the total area enclosed by the outer boundary of the coating to be less than 35%) and for them to preferably be in the region of 20% of the total area enclosed by the outer boundary of the coating. In experiments, this led to a particularly pronounced reduction in friction. The minimum depression area is 3% of the total area, i.e. the depressions cover at least 3% of the total area of the coating.

Preferably, the depressions extend so deep through the coating that they reach the material of the piston skirt and that therefore the undersides thereof are not formed by the material of the coating. Correspondingly deep depressions are particularly good oil reservoirs and therefore result in good lubrication.

Preferably, the boundary surfaces of the depression(s) extend at an angle with respect to the coating and the material of the surfaces they adjoin. This means that the boundary surfaces are not completely perpendicular; rather, they are at an angle. Thus, they form with the material of the coating and the material of the surfaces they adjoin an angle that is not equal to 90°.

Preferably, the depressions that are adjacent to one another in the axial direction are offset relative to one another along the circumferential direction. Accordingly, the depressions are not lined up one after the other in the axial direction; rather, the centre points thereof are offset along the circumferential direction, for example. A corresponding piston has particularly low friction during use.

The fact that the depressions are enclosed implies that the length of extension of at least some, preferably all, of the depressions along the circumferential direction is shorter than the length of extension along the circumferential direction of the coating in which these are formed. In other words, the depressions are so short that they do not extend from one side of the coating to the other side of the coating along the circumferential direction. Since the depressions are therefore so short that they are completely embedded in the coating, these can serve as oil reservoirs, and therefore significantly reduce the friction of the piston. This prevents them from acting as oil drains, since the oil cannot drain away via the depressions on the sides of the coating.

Preferably, the depressions have a substantially rectangular form. The ends of the depressions in the circumferential direction may also be rounded. Such a shape is easy to form. Thus, corresponding pistons are inexpensive to produce.

Preferably, the depressions have a width L of less than 2 mm and particularly preferably in the range of 0.6 to 0.8 mm. Correspondingly thin depressions have proven to be particularly advantageous in terms of oil retention behaviour, which may be due to capillary forces, amongst other things, without being limited to this theory.

Furthermore, a method is provided for producing a piston, wherein the coating including the depressions is applied by means of a screen-printing process. Such a process is particularly easy to implement and is also sufficiently accurate, which is why it is good for applying the coatings with the depressions. The precision of screen printing depends on various parameters, although it has been shown that it can be controlled comparatively well.

THE DRAWINGS

Figure 4A:
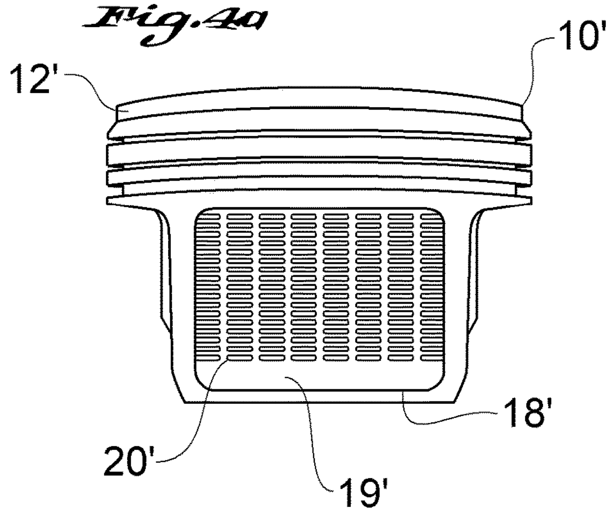
Figure 4B:
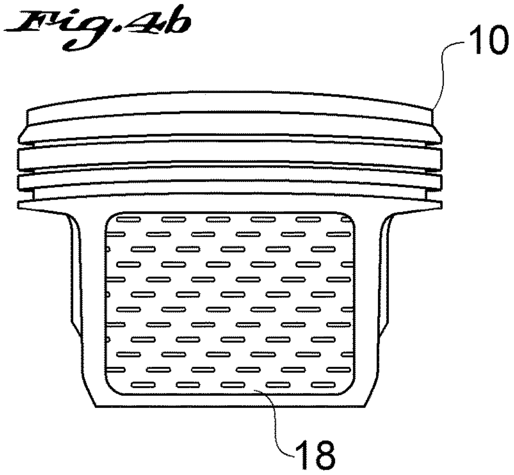
Figure 4C:
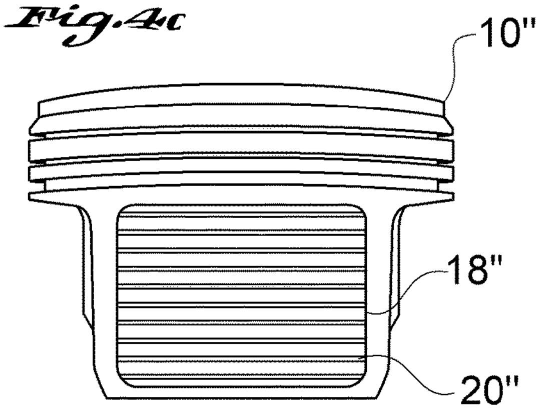

FIGS. 4*a*) and 4*b*) show different variants of a piston according to the invention. FIGS. 4*c*) and 4*d*) show a piston which is not in accordance with the invention.

DETAILED DESCRIPTION

Figure 1:
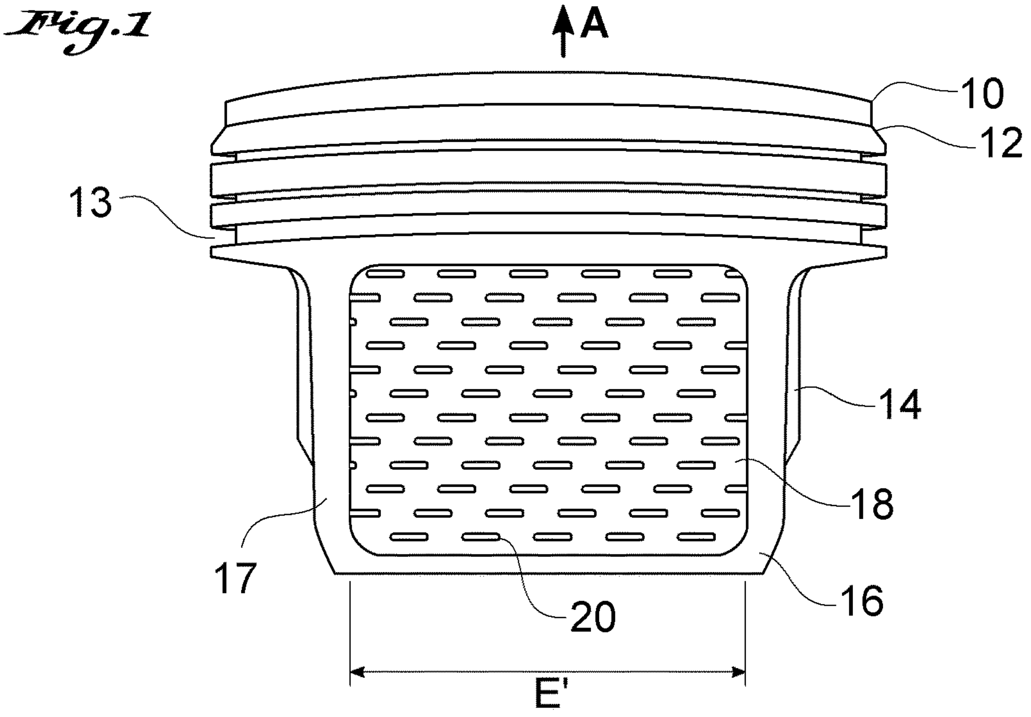
FIG. 1 shows a piston according to the invention according to one embodiment.

FIG. 1 shows a view of a piston 10 according to a first embodiment. The piston has a cylindrical shape with a cylinder axis A. A piston crown 12 of the piston having annular grooves 13 is adjoined by a piston skirt 14. The piston skirt 14 has convex surfaces 16, which constitute skirt walls, and box walls 17.

The cylindrical surfaces 16 abut the cylinder wall of the internal combustion engine during use of the piston and have a friction-reducing coating 18 of a polymer material containing graphite. The coating 18 is only provided on one part of the convex surface 16. The convex surface 16 adjoins the annular region with the annular grooves 13 of the piston. The coating 18 extends along the circumference of the piston over a length E'.

Rectangular depressions 20 are provided in the coating 18, which extend through the coating material such that the material of the piston is exposed through the depressions 20. The ends of the rectangular depressions may be rounded. A plurality of depressions 20 is lined up along the circumferential direction. There is a plurality of such rows of lined-up depressions 20, which are offset relative to one another along the circumferential direction such that the axially adjacent depressions 20 are offset relative to one another along the circumferential direction.

Figure 2:
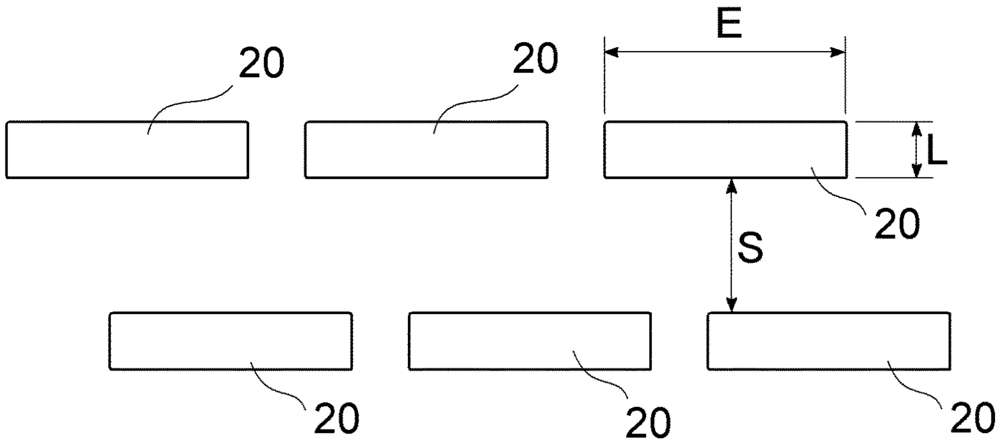
FIG. 2 shows a detailed view of coatings of the piston according to the invention.

The depressions 20 are shown in more detail in FIG. 2. A plurality of depressions 20, which are offset relative to one another along the circumferential direction of the piston 10, is shown here in two rows. In plan view, the depressions 20 have a rectangular form and a length E along the circumferential direction and a width L in the axial direction A. The spacing between two adjacent depressions 20 in the axial direction is defined as S. For the spacing S, S>2L applies.

Figure 3:
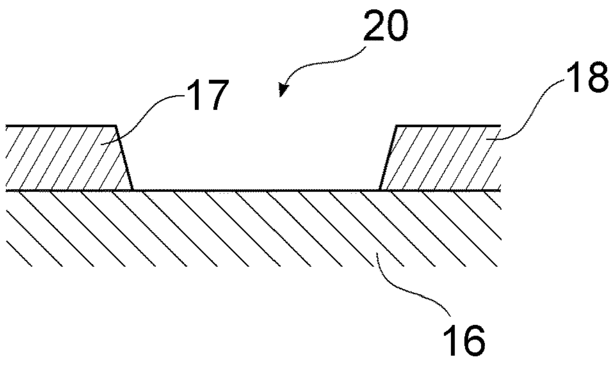
FIG. 3 shows a cross-sectional view of a depression of the piston according to the invention.

FIG. 3 shows a cross section through a depression 20 along the circumferential direction. As can be seen in this drawing, the boundary surfaces 17 of the depression are inclined with respect to the material of the convex surfaces 16 and also form an angle with the material of the coating 18. The depression 20 is closed at the bottom, i.e. the underside of the depression 20 is formed by the material of the piston 16 and is closed, such that it prevents oil from draining away downwards.

It has been ascertained that a piston 10 designed as shown in FIG. 1 to 3 has friction that is reduced by up to 20%. This is due to the fact that the depressions 20 have comparatively good oil retention properties. In this respect, oil accumulates therein and then reduces the friction. In contrast to depressions which extend over the entire width of the coating, oil retention properties are improved, since the oil cannot drain away. It is important for oil retention behaviour that the slots are formed so as to be sufficiently narrow and deep. Calculations that make this behaviour plausible are described in the paper by M. Scholle entitled "Hydrodynamical modelling of lubricant friction between rough surfaces", in Tribology International 40 (2007), pp. 1004-1011, for example.

FIG. 4 shows in drawings a) and b) pistons according to the invention. FIG. 4*b*) corresponds to the piston already shown in FIG. 1. Thus, this piston will not be addressed in detail.

FIG. 4*a*) shows a piston 10' according to a second embodiment, having a coating 18' in which depressions 20' are arranged such that adjacent depressions 20' are lined up along the axial direction of the piston. Moreover, an area 19' of the coating in which no depressions 20' are provided is located on the side of the coating 18' opposite the piston crown 12'. Even though such an arrangement of the depressions 20' is less advantageous compared to the first embodiment in terms of oil retention capability, a corresponding piston is improved as compared to the prior art in terms of oil retention properties, and therefore has less friction.

FIG. 4*c*) shows a further piston 10", which is not part of the invention. This piston 10" also has a coating 18" comprising depressions 20". However, these depressions 20" extend along the circumferential direction of the piston 10" over the entire width of the coating 18" and are therefore not enclosed, as is stipulated by embodiments of the invention. In the previous embodiments in FIG. 4*a*) and FIG. 4*b*), the depressions 20, 20' each extend only over a portion of the coating 18, 18' along the circumferential direction, and not over the entire width of the coating 18, 18'. The fact that the depressions 20" extend over the entire width of the coating 18" means that oil can drain away therefrom. This then results in increased friction compared to pistons in which the depressions are enclosed.

Figure 4D:
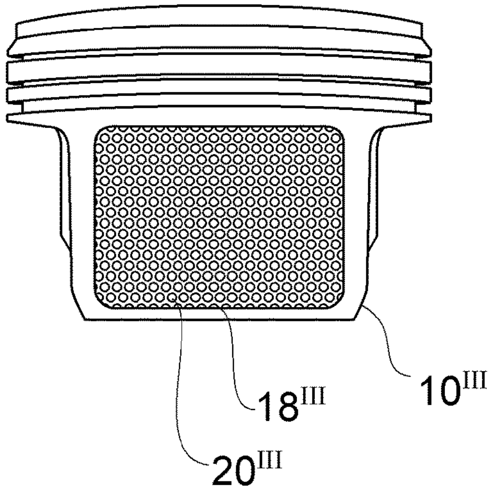

FIG. 4*d*) shows a piston 10111 which is not in accordance with the invention. Here, substantially circular depressions 20''' are provided in a coating 18111, which are arranged in a plurality of rows along the circumferential direction of the piston 10111 and which are offset relative to one another along the circumferential direction. The depressions 20111 shown herein do not meet the requirement that S>2L; rather, they are arranged too closely together. Moreover, E>L does not apply here.

The coatings 18 to 18111 shown in FIG. 4*a*) to 4*d*) can be produced by means of a screen-printing process.

What is claimed is:

1. A piston for use in internal combustion engines, comprising:

a piston crown, which is adjoined by a piston skirt, wherein the piston skirt has surfaces which have a predetermined height and which abut a cylinder wall during use of the piston, wherein the surfaces have one or more friction-reducing coatings and wherein a plurality of depressions are provided in the coating, which are arranged in such a way that a spacing S between each two adjacent depressions along an axial direction (A) of the piston and the width L of the depressions along the axial direction (A) of the piston satisfy a formula S>2L, wherein one or more of the depressions are enclosed by the coating in which they are formed, wherein the plurality of the depressions is provided in alignment along the circumference of the piston in one of the one or more coatings; and wherein the spacing S is less than 10% of the height of the surfaces of the piston skirt.

2. The piston according to claim 1, wherein the depressions extend through the coating such that they reach the material of the piston skirt.

3. The piston according to claim 1, wherein boundary surfaces of the depressions extend at an angle with respect to the coating and the material of the surfaces they adjoin.

4. The piston according to claim 1, wherein a length of extension (E) of at least some of the depressions along the circumferential direction is shorter than a length of extension (E') along the circumferential direction of the coating in which these are formed.

5. The piston according to claim 4, wherein the depressions that are adjacent to one another in the axial direction are offset relative to one another in the circumferential direction.

6. The piston according to claim 1, wherein the depressions have a substantially rectangular form.

7. The piston according to claim 1, wherein the depressions have a width L of less than 2 mm.

8. A method for producing a piston according to claim 1, wherein the coating including the depressions is applied by screen-printing.

9. The piston according to claim 1, wherein all of the depressions are enclosed by the coating.

10. The piston according to claim 4, wherein the length of extension (E) of all of the depressions in the circumferential direction of the coating is shorter than the length of extension (E') in the circumferential direction.

11. The piston according to claim 7, wherein the width L is in the range of 0.6 to 0.8 mm.

* * * * *